US012741359B2

(12) United States Patent
Huang

(10) Patent No.: US 12,741,359 B2
(45) Date of Patent: Sep. 22, 2026

(54) DISMANTLING TOOL

(71) Applicant: SHIFUKANG INDUSTRIAL.CO., LTD., Taichung City (TW)

(72) Inventor: Shang-Yuan Huang, Taichung City (TW)

(73) Assignee: SHIFUKANG INDUSTRIAL.CO., LTD., Taichung City (TW)

( * ) Notice: Subject to any disclaimer, the term of this patent is extended or adjusted under 35 U.S.C. 154(b) by 378 days.

(21) Appl. No.: 18/497,215

(22) Filed: Oct. 30, 2023

(65) Prior Publication Data

US 2024/0300077 A1 Sep. 12, 2024

(30) Foreign Application Priority Data

Mar. 10, 2023 (TW) ................................ 112108821

(51) Int. Cl.
*B25B 27/02* (2006.01)

(52) U.S. Cl.
CPC .................................. *B25B 27/023* (2013.01)

(58) Field of Classification Search
CPC ................. B25B 27/023; B25B 27/062; Y10T 29/53657; Y10T 29/53683; Y10T 29/53987; Y10T 29/53848–53865; Y10T 29/53878; Y10T 29/53891; Y10T 29/53983
See application file for complete search history.

(56) References Cited

U.S. PATENT DOCUMENTS 1,747,689 A * 2/1930 Wubbenhorst ........ B25B 27/062 29/260
1,936,624 A * 11/1933 Gelpcke .................. F16B 37/14 411/372
3,696,496 A * 10/1972 Corder .................. B25B 27/026 29/260
2020/0039041 A1* 2/2020 Huang .................. B25B 27/062

* cited by examiner

*Primary Examiner* — Tyrone V Hall, Jr.
(74) *Attorney, Agent, or Firm* — MUNCY, GEISSLER, OLDS & LOWE, P.C.

(57) ABSTRACT

A dismantling tool is provided, wherein the dismantling tool includes: a main body including a first base, a second base and at least one connecting member, the at least one connecting member being connected to and between the first base and the second base, the first base including a threaded hole disposed therethrough in a driving direction, the second base including an engaging hole disposed therethrough in the driving direction, in the driving direction the engaging hole and the threaded hole at least partially overlapping with each other, the engaging hole extending through the second base in a direction transverse to the driving direction; and a push rod assembly screwed to the threaded hole and configured to be movable toward the second base in the driving direction to push an object.

8 Claims, 7 Drawing Sheets

DISMANTLING TOOL

BACKGROUND OF THE INVENTION

Field of the Invention

The present invention relates to a dismantling tool.

Description of the Prior Art

The conventional method to disassemble tight-fitting structures, such as bearings or joints, or two objects that are stuck due to rust at their connection portion, is to use an impact tool (such as a hammer) to force parts to separate from each other.

However, the conventional method is too time-consuming and labor-intensive, and can easily cause irreversible damage to the structure of the object, and may lead to problems such as weakening of the structural strength and unsmooth operation of the object to be dismantled.

The present invention is, therefore, arisen to obviate or at least mitigate the above-mentioned disadvantages.

SUMMARY OF THE INVENTION

The main object of the present invention is to provide a dismantling tool which can efficiently and quickly dismantles an object without damaging structures adjacent to the object.

To achieve the above and other objects, a dismantling tool is provided, wherein the dismantling tool includes: a main body including a first base, a second base and at least one connecting member, the at least one connecting member being connected to and between the first base and the second base, the first base including a threaded hole disposed therethrough in a driving direction, the second base including an engaging hole disposed therethrough in the driving direction, in the driving direction the engaging hole and the threaded hole at least partially overlapping with each other, the engaging hole extending through the second base in a direction transverse to the driving direction; and a push rod assembly screwed to the threaded hole and configured to be movable toward the second base in the driving direction to push an object.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
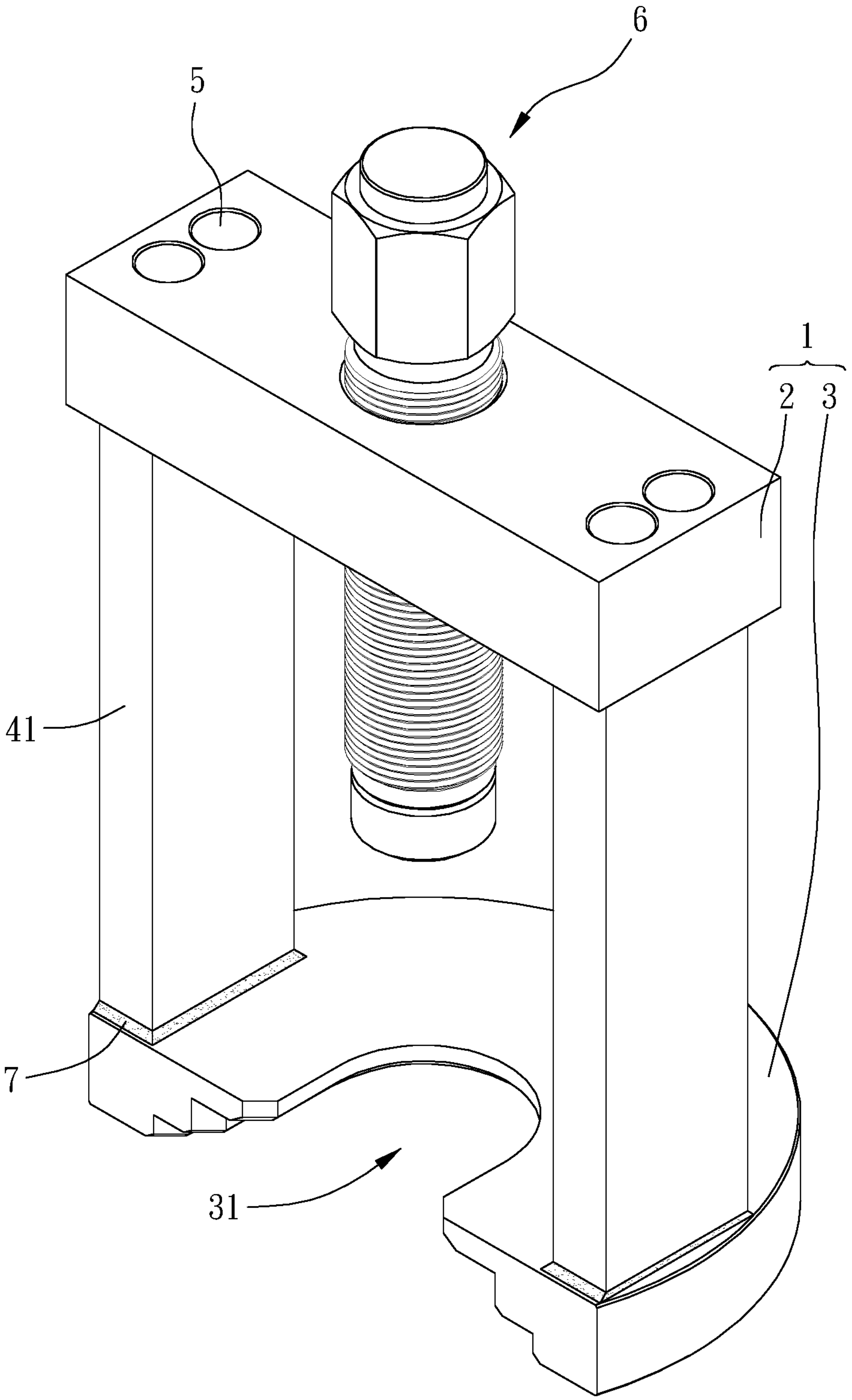
FIG. 1 is a stereogram of an exemplary embodiment of the present invention.
Figure 2:
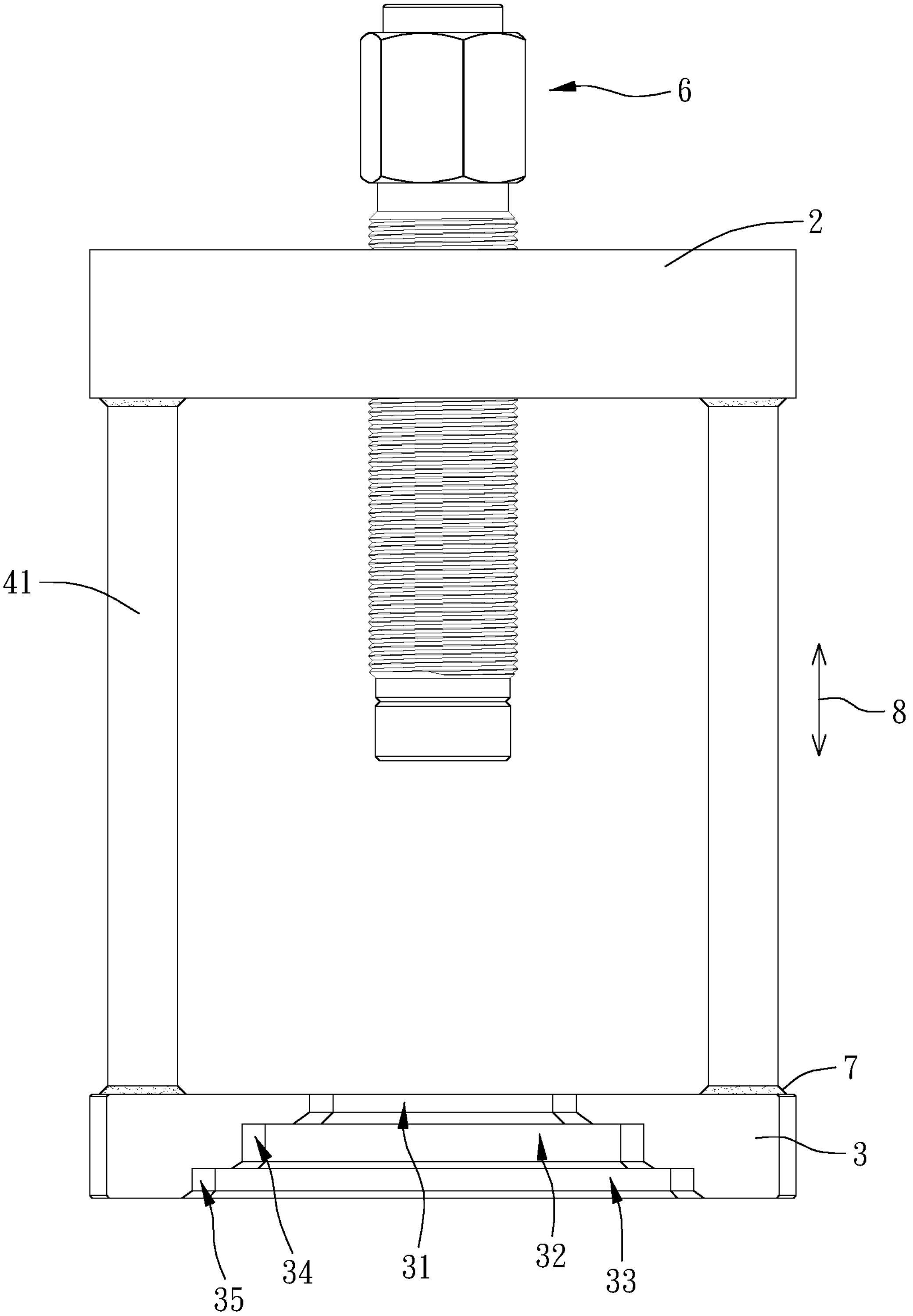
FIG. 2 is a front view of an exemplary embodiment of the present invention.
Figure 3:
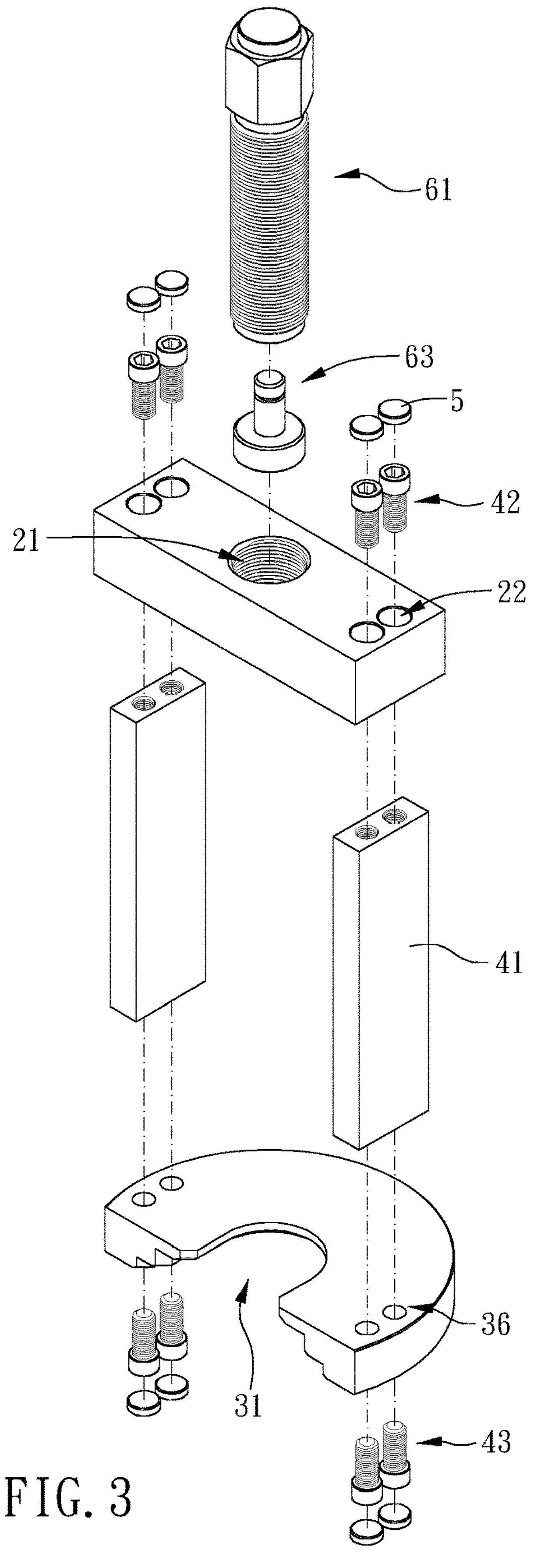
FIG. 3 is a breakdown drawing of an exemplary embodiment of the present invention.
Figure 4:
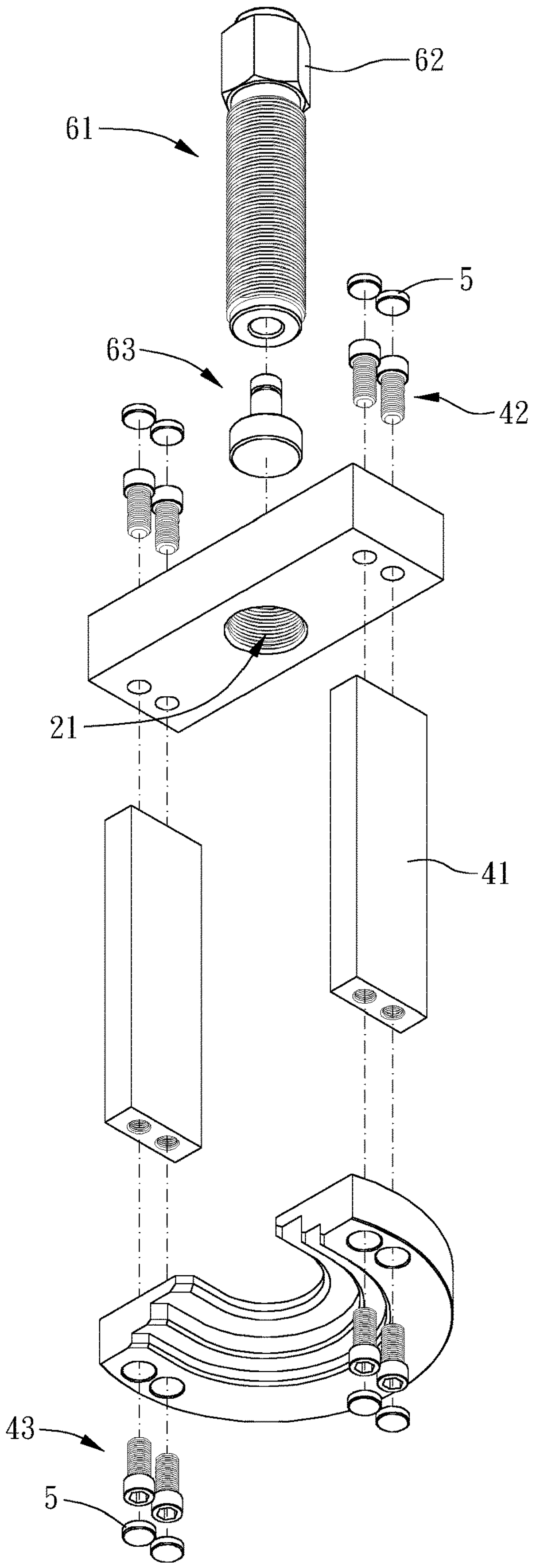
FIG. 4 is another breakdown drawing of an exemplary embodiment of the present invention.
Figure 5:
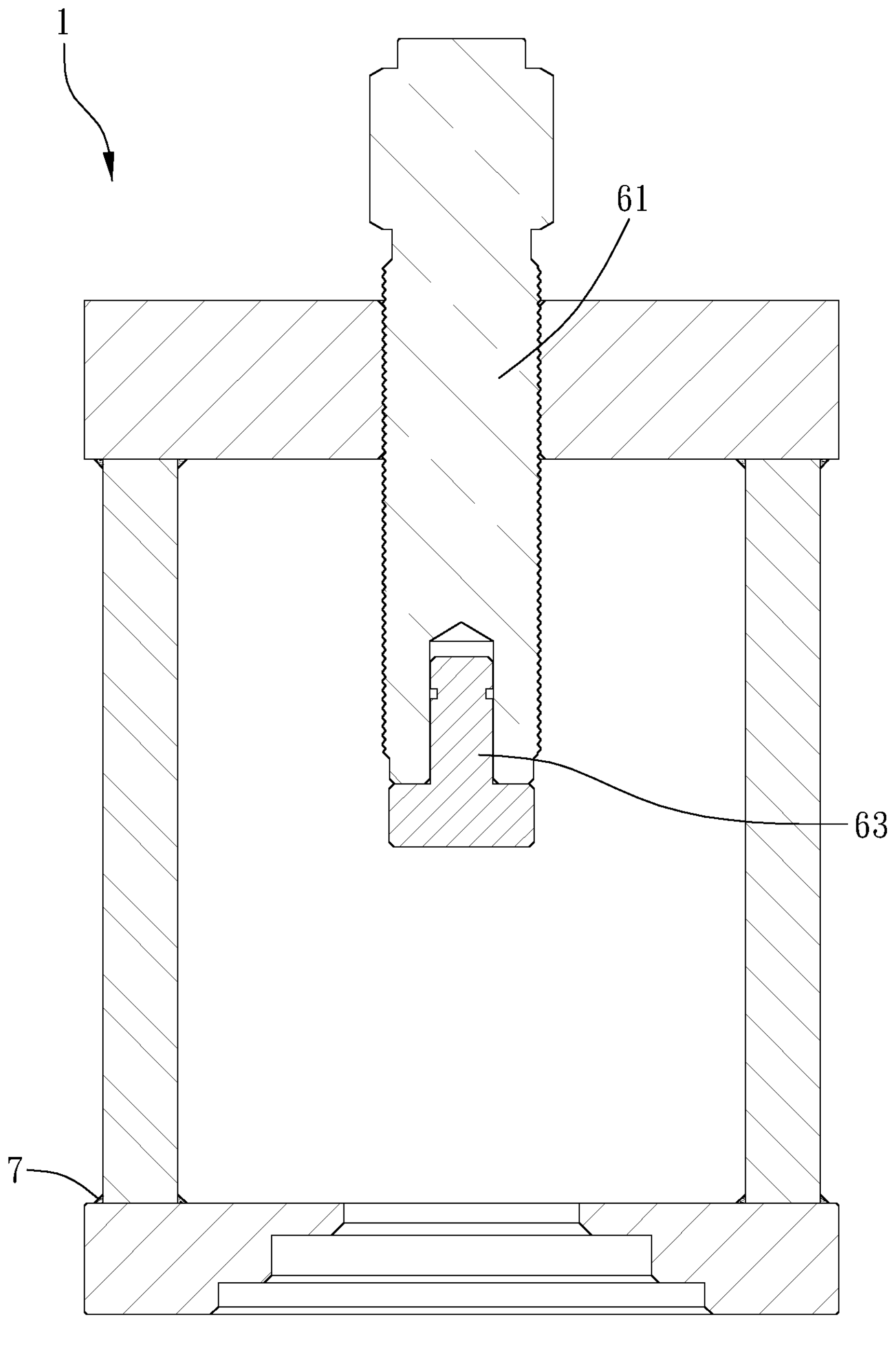
FIG. 5 is a cross-sectional view of an exemplary embodiment of the present invention.
Figure 6:
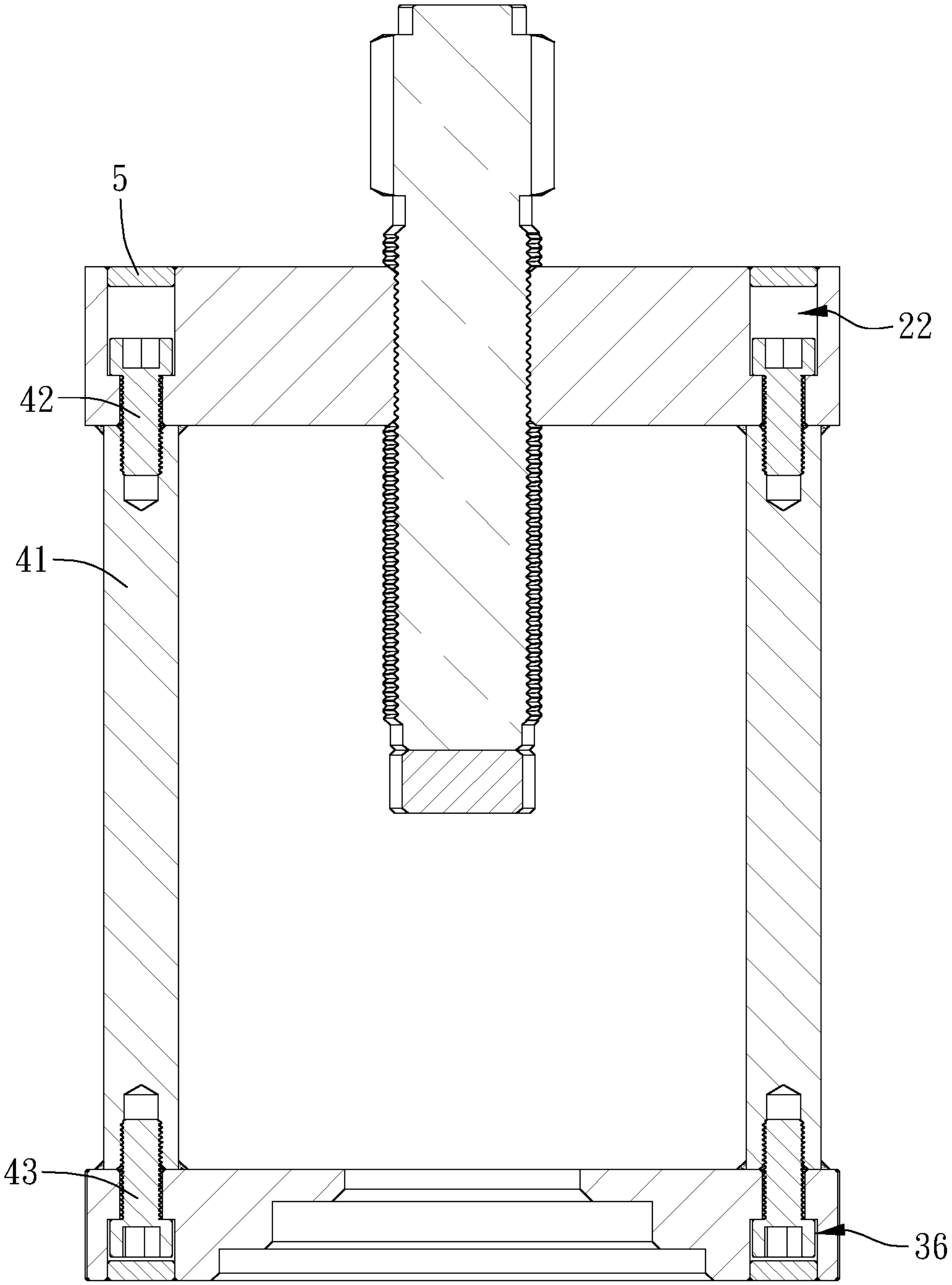
FIG. 6 is another cross-sectional view of an exemplary embodiment of the present invention.
Figure 7:
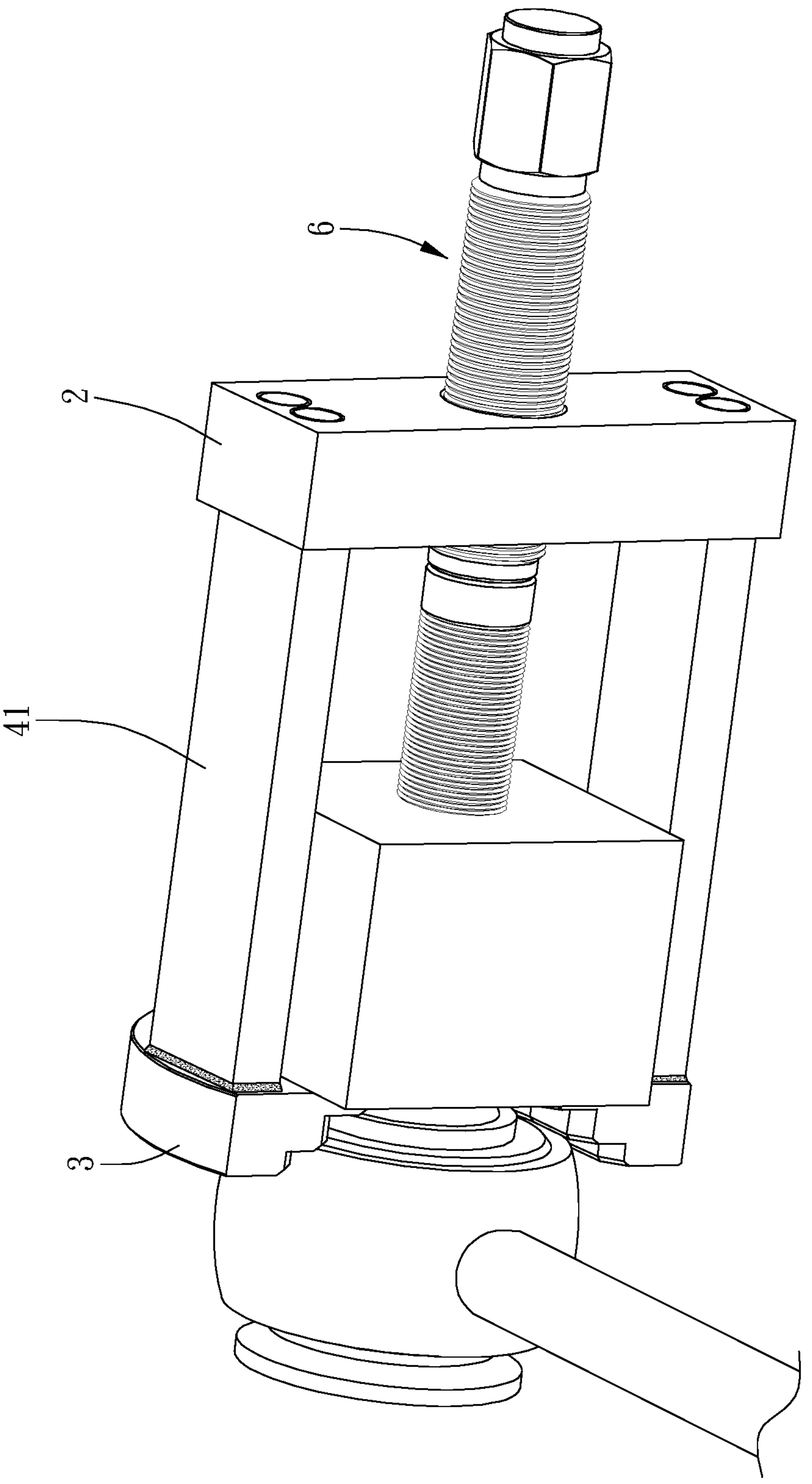
FIG. 7 is a drawing showing operation of an exemplary embodiment of the present invention.

Please refer to FIGS. 1 to 7 for an exemplary embodiment of the present invention. A dismantling tool of the present invention includes a main body 1 and a push rod assembly 6.

The main body 1 includes a first base 2, a second base 3 and at least one connecting member 41, the at least one connecting member 41 is connected to and between the first base 2 and the second base 3, the first base 2 includes a threaded hole 21 disposed therethrough in a driving direction 8, the second base 3 includes an engaging hole 31 in the driving direction 8, and in the driving direction 8 the engaging hole 31 and the threaded hole 21 at least partially overlap with each other. In this embodiment, in the driving direction 8 a projection of the threaded hole 21 is entirely within the engaging hole 31, and the engaging hole 31 extends through the second base 3 in a direction transverse to the driving direction 8 so that it is easy to assemble from a lateral direction. The push rod assembly 6 is screwed to the threaded hole 21 and configured to be movable toward the second base 3 in the driving direction 8 to push an object. For example, the dismantling tool is configured to be used in a suspension system of a car, the second base 3 can be bridged between the torsion rod and the frame' by pushing the push rod assembly 6 along the driving direction 8 against the joint protruding from the frame, the joint is forced to be detached from the frame.

Specifically, the first base 2 further includes at least one first through hole 22, the second base 3 further includes at least one second through hole 36, the at least one first threaded member 42 is disposed through the at least one first through hole 22 and screwed to a side of the at least one connecting member 41, and the at least one second threaded member 43 is disposed through the at least one second through hole 36 and screwed to another side of the at least one connecting member 41. As such, the first base 2, the second base 3 and the at least one connecting member 41 are connected to be integral.

Specifically, the dismantling tool further includes a plurality of covers 5, and the plurality of covers 5 cover the at least one first through hole 22 and the at least one second through hole 36. Each of the plurality of covers 5 can effectively block foreign matters and/or moisture from entering the at least one first through hole 22 or the at least one second through hole 36; and each of the plurality of covers 5 can also effectively prevent the at least one first threaded member 42 or the at least one second threaded member 43 from being rotated. In this embodiment, the at least one first through hole includes a plurality of first through holes 22, the at least one second through hole includes a plurality of second through holes 36, and the number of the plurality of first through holes 22 is equal to the number of the plurality of second through holes 36, to provide an even connection force. Additionally, each of the plurality of covers 5 is engaged, in tight fit, in one of the plurality of first through holes 22 and the plurality of second through holes 36, to facilitate assembly and make the cover 5 stable.

Preferably, opposing sides of the at least one connecting member 41 are fixedly connected to the first base 2 and the second base 3, respectively, so that the main body 1 is formed as an integral configuration.

Preferably, the dismantling tool further includes a plurality of fixation portions 7, the plurality of fixation portions 7 are disposed between the at least one connecting member 41 and the first base 2, and between the at least one connecting member 41 and the second base 3. Each of the plurality of fixation portions 7 is a weld portion so that the at least one connecting member 41 and the first base 2 are strongly connected to each other. In other embodiments, and a binding material may be applied to the at least one first threaded member or the at least one second threaded member to provide a reliable connection.

In this embodiment, the first base 2 is a cuboid, the second base 3 is U-shaped, the at least one connecting member includes two connecting members 41, the two connecting members 41 are symmetrically arranged at two sides by the threaded hole 21, and each of the two connecting members 41 is rectangular.

At least one recess is disposed on a side of the second base 3 opposite to the first base 2, and the at least one recess is arranged around the engaging hole 31. The at least one recess has a diametric dimension larger than a diametric dimension of the engaging hole 31 so that at least one stepped portion is formed between the at least one recess and the engaging hole 31. The at least one recess is configured to receive a portion of the object to be removed. For example, for a torque rod of a car, the at least one recess is configured to receive a head portion of the torque rod.

Specifically, the at least one recess includes a first recess 32 and a second recess 33, the first recess 32 has a diametric dimension larger than a diametric dimension of the engaging hole 31 so that a first stepped portion 34 is formed between the first recess 32 and the engaging hole 31, and the second recess 33 has a diametric dimension larger than a diametric dimension of the first recess 32 so that a second stepped portion 35 is formed between the first recess 32 and the second recess 33. For a torque rod of a car, the first recess 32 and the second recess 33 can be configured to receive head portions of torque rods of different sizes, and the first stepped portion 34 and the second stepped portion 35 can be configured to support the head portions of the torque rods.

In this embodiment, the push rod assembly 6 includes a bolt 61 and a push member 63, the bolt 61 is screwed to the threaded hole 21, the push member 63 is detachably connected to an end of the bolt 61 directed toward the second base 3 for easy change of the push member 63, and the push member 63 is configured to push the object to be removed. An end of the bolt 61 remote from the push member 63 includes a drive portion 62, and the drive portion 62 is configured to be connected to a driving tool.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A dismantling tool including:

a main body including a first base, a second base and at least one connecting member, the second base being integrally formed of one piece, the at least one connecting member being connected to and between the first base and the second base, the first base including a threaded hole disposed therethrough in a driving direction, the second base including an engaging hole disposed therethrough in the driving direction, in the driving direction the engaging hole and the threaded hole at least partially overlapping with each other, the engaging hole extending through the second base in a direction transverse to the driving direction; and a push rod assembly screwed to the threaded hole and configured to be movable toward the second base in the driving direction to push an object, wherein at least one recess is disposed on a side of the second base opposite to the first base, the at least one recess is arranged around the engaging hole, the at least one recess has a diametric dimension larger than a diametric dimension of the engaging hole so that at least one stepped portion is formed between the at least one recess and the engaging hole, and the at least one recess is configured to receive a portion of the object;

wherein the at least one recess includes a first recess and a second recess, the first recess has a diametric dimension larger than a diametric dimension of the engaging hole so that a first stepped portion is formed between the first recess and the engaging hole, and the second recess has a diametric dimension larger than a diametric dimension of the first recess so that a second stepped portion is formed between the first recess and the second recess;

wherein the engaging hole expands toward the first recess, the first recess expands toward the second recess, and the second recess expands toward and terminates on an end of the second base.

2. The dismantling tool of claim 1, wherein the first base further includes at least one first through hole, the second base further includes at least one second through hole, at least one first threaded member is disposed through the at least one first through hole and screwed to a side of the at least one connecting member, and at least one second threaded member is disposed through the at least one second through hole and screwed to another side of the at least one connecting member.

3. The dismantling tool of claim 2, further including a plurality of covers, wherein the plurality of covers cover the at least one first through hole and the at least one second through hole.

4. The dismantling tool of claim 1, wherein the push rod assembly includes a bolt and a push member, the bolt is screwed to the threaded hole, the push member is detachably connected to an end of the bolt directed toward the second base, and the push member is configured to push the object.

5. The dismantling tool of claim 1, wherein opposing sides of the at least one connecting member are fixedly connected to the first base and the second base, respectively, so that the main body is formed as an integral configuration.

6. The dismantling tool of claim 5, further including a plurality of fixation portions, wherein the plurality of fixation portions are disposed between the at least one connecting member and the first base and between the at least one connecting member and the second base.

7. The dismantling tool of claim 6, wherein each of the plurality of fixation portions is a weld portion.

8. The dismantling tool of claim 1, wherein the first base further includes at least one first through hole, the second base further includes at least one second through hole, at least one first threaded member is disposed through the at least one first through hole and screwed to a side of the at least one connecting member, and at least one second threaded member is disposed through the at least one second through hole and screwed to another side of the at least one connecting member; the dismantling tool further includes a plurality of covers, the plurality of covers cover the at least one first through hole and the at least one second through hole; the push rod assembly includes a bolt and a push member, the bolt is screwed to the threaded hole, the push member is detachably connected to an end of the bolt directed toward the second base, and the push member is configured to push the object; opposing sides of the at least one connecting member are fixedly connected to the first base and the second base, respectively, so that the main body is formed as an integral configuration; the dismantling tool further includes a plurality of fixation portions, and the plurality of fixation portions are disposed between the at least one connecting member and the first base and between the at least one connecting member and the second base; each of the plurality of fixation portions is a weld portion; an end of the bolt remote from the push member includes a drive portion, and the drive portion is configured to be connected to a driving tool; the first base is a cuboid, and the second base is U-shaped; the at least one connecting member includes two connecting members, the two connecting members are symmetrically arranged at two sides by the threaded hole, and each of the two connecting members is rectangular; in the driving direction a projection of the threaded hole is entirely within the engaging hole; the at least one first through hole includes a plurality of first through holes, the at least one second through hole includes a plurality of second through holes, and the number of the plurality of first through holes is equal to the number of the plurality of second through holes; each of the plurality of covers is engaged, in tight fit, in one of the plurality of first through holes and the plurality of second through holes.

* * * * *